US007467357B2

(12) United States Patent
Machida

(10) Patent No.: US 7,467,357 B2
(45) Date of Patent: Dec. 16, 2008

(54) DISPLAY METHOD AND APPARATUS USING TABLE TO DESIGNATE PERIPHERALS

(75) Inventor: Haruo Machida, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 10/998,588

(22) Filed: Nov. 30, 2004

(65) Prior Publication Data
US 2005/0097472 A1 May 5, 2005

Related U.S. Application Data

(62) Division of application No. 09/671,161, filed on Sep. 28, 2000, now Pat. No. 6,885,387.

(30) Foreign Application Priority Data

| Oct. 1, 1999 | (JP) | ................................. 11-281969 |
| Oct. 4, 1999 | (JP) | ................................. 11-283094 |
| Sep. 27, 2000 | (JP) | ............................. 2000-294645 |

(51) Int. Cl.
G06F 3/00 (2006.01)
(52) U.S. Cl. ....................................... 715/854; 715/738
(58) Field of Classification Search ................. 715/769, 715/748, 734–737, 810, 838, 854, 853, 855, 715/738; 709/220–226
See application file for complete search history.

(56) References Cited

U.S. PATENT DOCUMENTS

| 5,261,044 A | | 11/1993 | Dev et al. .................... 345/855 |
| 5,500,929 A | * | 3/1996 | Dickinson .................... 715/853 |
| 5,701,137 A | | 12/1997 | Kiernan et al. .............. 345/119 |
| 5,764,913 A | | 6/1998 | Jancke et al. ........... 395/200.54 |
| 5,793,974 A | | 8/1998 | Messinger ................... 709/224 |
| 5,796,951 A | | 8/1998 | Hamner et al. .............. 709/223 |
| 5,821,937 A | * | 10/1998 | Tonelli et al. ................ 715/853 |
| 5,911,044 A | * | 6/1999 | Lo et al. ....................... 709/203 |
| 5,935,217 A | * | 8/1999 | Sakai et al. .................. 709/249 |
| 5,958,012 A | | 9/1999 | Battat et al. .................. 709/224 |
| 6,211,877 B1 | * | 4/2001 | Steele et al. ................. 715/804 |
| 6,219,053 B1 | | 4/2001 | Tachibana et al. ........... 345/835 |
| 6,229,540 B1 | * | 5/2001 | Tonelli et al. ................ 715/735 |
| 6,240,410 B1 | * | 5/2001 | Wical ............................ 707/4 |

(Continued)

FOREIGN PATENT DOCUMENTS

EP 0 457 445 11/1991

(Continued)

Primary Examiner—Sy D Luu
(74) Attorney, Agent, or Firm—Fitzpatrick, Cella, Harper & Scinto

(57) ABSTRACT

A network apparatus is capable of calculating positions on a display screen where connecting states of network apparatuses connected to a network are displayed on the basis of connecting information of the network apparatuses on the network and peripherals connected thereto and displaying the positions. In addition, a controller is provided for controlling in such a manner that when it is necessary to change the display positions by a display change instruction, the display positions are again calculated and displayed on a display screen, and when a reduced display is designated, the peripherals connected to the network apparatus on the network are not displayed, and when an expanded display is designated, the peripherals connected to the network apparatus on the network are displayed.

12 Claims, 17 Drawing Sheets

U.S. PATENT DOCUMENTS

| | | | |
|---|---|---|---|
| 6,282,175 B1 | 8/2001 | Steele et al. | 370/254 |
| 6,327,613 B1 | 12/2001 | Goshey et al. | 709/208 |
| 6,496,208 B1 * | 12/2002 | Bernhardt et al. | 715/853 |
| 6,553,431 B1 * | 4/2003 | Yamamoto et al. | 710/8 |
| 6,556,875 B1 * | 4/2003 | Nagasaka et al. | 700/19 |
| 6,633,913 B1 * | 10/2003 | Chalstrom et al. | 709/226 |
| 6,725,300 B1 * | 4/2004 | Nagasaka et al. | 710/62 |
| 6,765,591 B2 * | 7/2004 | Poisson et al. | 715/735 |
| 7,106,464 B1 * | 9/2006 | Brylov | 358/1.15 |
| 7,143,159 B1 * | 11/2006 | Grace et al. | 709/224 |
| 7,228,506 B2 * | 6/2007 | Ivanovic et al. | 715/772 |
| 7,315,985 B1 * | 1/2008 | Gauvin et al. | 715/734 |

FOREIGN PATENT DOCUMENTS

EP 0 717 342 6/1996

* cited by examiner

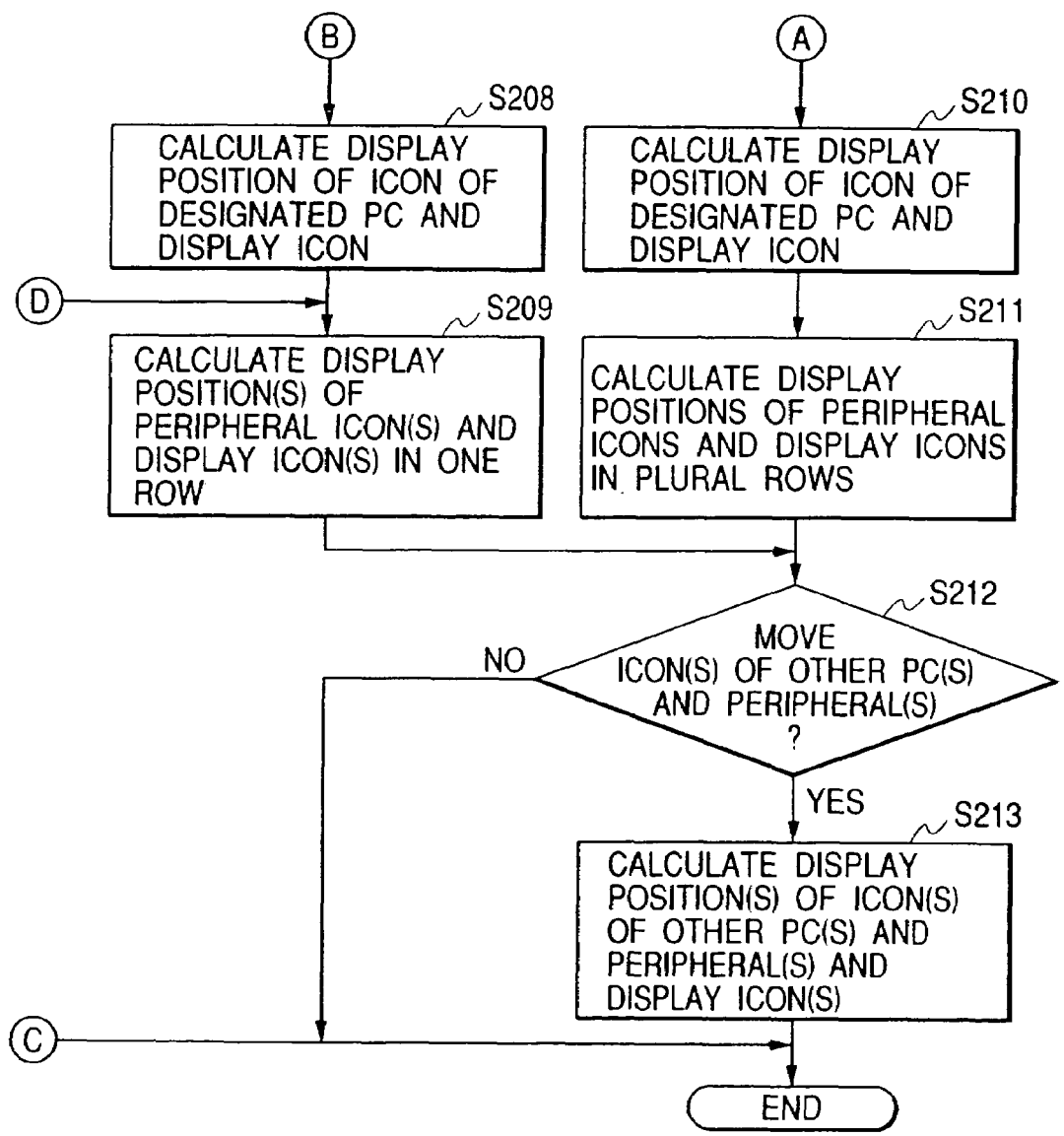

FIG. 15

| HEADER INFO | VERSION INFO | |
| --- | --- | --- |
| | NO. OF INDEX TABLES : N | |
| | DATA INFO OFFSET | |
| INDEX TABLE | INDEX [0] | DATA OFFSET |
| | | DATA SIZE |
| | | FLAG |
| | ⋮ | |
| | INDEX [N-1] | DATA OFFSET |
| | | DATA SIZE |
| | | FLAG |
| 1501 — PC INFO [0] | 1503 — HEADER INFO | PC NAME |
| | | LOGON USER |
| | | LICENSE INFO |
| | | OS INFO |
| | | NO. OF PRINTER INFO : P |
| | | NO. OF SCANNER INFO : S |
| | | NO. OF FAX INFO : F |
| | 1504 — PRINTER INFO [0] | PRINTER NAME |
| | | DRIVER NAME |
| | | PORT INFO |
| | | ATTRIBUTE INFO |
| | ⋮ | |
| | 1505 — PRINTER INFO [P-1] | PRINTER NAME |
| | | DRIVER NAME |
| | | PORT INFO |
| | | ATTRIBUTE INFO |
| | 1506 — SCANNER INFO [0] | SCANNER NAME |
| | | DRIVER NAME |
| | | ATTRIBUTE INFO |
| | ⋮ | |
| | 1507 — SCANNER INFO [S-1] | SCANNER NAME |
| | | DRIVER NAME |
| | | ATTRIBUTE INFO |
| | 1508 — FAX INFO [0] | FAX NAME |
| | | DRIVER NAME |
| | | ATTRIBUTE INFO |
| | ⋮ | |
| | 1509 — FAX INFO [F-1] | FAX NAME |
| | | DRIVER NAME |
| | | ATTRIBUTE INFO |
| ⋮ | | |
| 1502 — PC INFO [N-1] | HEADER INFO | |
| | PRINTER INFO | |
| | SCANNER INFO | |
| | FAX INFO | |

FIG. 16

| HEADER INFO | VERSION INFO | |
| --- | --- | --- |
| | NO. OF FUNCTION INFO : N | |
| | DATA INFO OFFSET | |
| 1601 — FUNCTION [0] | FUNCTION | COPY |
| | INPUT DEVICE | SCANNER |
| | OUTPUT DEVICE | PRINTER |
| 1602 — FUNCTION [1] | FUNCTION | FAX |
| | INPUT DEVICE | SCANNER |
| | OUTPUT DEVICE | FAX |
| | | |
| FUNCTION [N-1] | FUNCTION | FAX |
| | INPUT DEVICE | SCANNER |
| | OUTPUT DEVICE | FAX | ations
DISPLAY METHOD AND APPARATUS USING TABLE TO DESIGNATE PERIPHERALS

This is a divisional application of application Ser. No. 09/671,161, filed on Sep. 28, 2000.

BACKGROUND OF THE INVENTION

1. Field of the Invention

The invention relates to a network apparatus and, more particularly, to a technique for displaying a connecting state of network apparatuses which are connected onto a network.

2. Related Background Art

In recent years, personal computers (hereinafter, referred to as PCs) and their peripherals have been spread and a network such as a local area network (hereinafter, referred to as an LAN) or the like has also been spread. There are a printer, a scanner, a digital camera, and the like as peripherals mentioned above.

Needs for sharing a printer, a modem, or a scanner on the network have also been increased. By sharing the peripherals such as printer, scanner, and the like on the network, an environment such that every apparatus on the network can be used is obtained.

There is, however, not a technique such that all PCs and their peripherals which can be used are efficiently displayed on the same screen, which apparatus is connected to the network can be displayed, or an installing state or a processing state of each driver can be displayed.

It is an object of the invention to provide a display technique of network apparatuses, in which a connecting state of the network apparatus which is connected to a network can be efficiently displayed.

SUMMARY OF THE INVENTION

The invention is made in consideration of the above problems.

According to one aspect of the invention, there is provided an information processing apparatus which can communicate through a network with each of a plurality of information processing apparatuses connected to the network, wherein the apparatus has a function for displaying a virtual system display screen for graphically displaying connecting states of the plurality of information processing apparatuses and peripherals locally connected to each information processing apparatus.

In response to a user action for an icon of the information processing apparatus on the virtual system display screen, an icon showing the peripheral locally connected to the information processing apparatus corresponding to the icon as a target of the action is displayed, and the display positions of the icons which have already been displayed on the virtual system display screen are calculated on the basis of display spaces of peripheral icons which are newly displayed on the virtual system display screen.

According to the invention constructed as mentioned above, by calculating the positions where the network apparatuses connected to the network and/or the peripherals connected to the network apparatuses are displayed on the display screen, the network apparatuses and/or the peripherals can be efficiently displayed.

The above and other objects and features of the present invention will become apparent from the following detailed description and the appended claims with reference to the accompanying drawings.

BRIEF DESCRIPTION OF THE DRAWINGS

FIGS. 15 and 16 are diagrams showing examples of a structure of a data table which is stored in the network apparatus according to the third embodiment.

DETAILED DESCRIPTION OF THE PREFERRED EMBODIMENTS

Embodiments of the invention will now be described hereinbelow with reference to the drawings.

Figure 1:
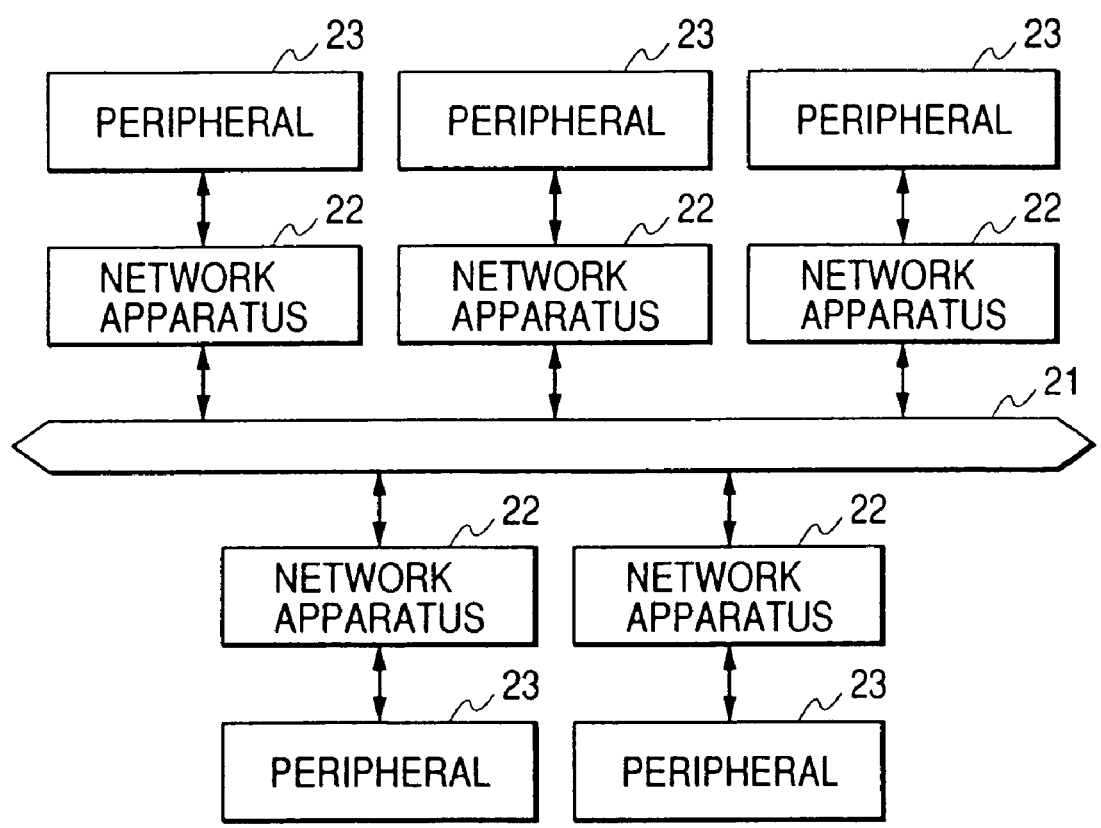
FIG. 1 is a block diagram showing a network construction according to the invention.

FIG. 1 is a block diagram showing a network construction according to an embodiment of the invention.

A communication network 21 is a communication network such as Ethernet or the like. A plurality of network apparatuses 22 are connected to the communication network 21. The network apparatuses 22 are, for example, PCs.

A peripheral 23 can be connected to each network apparatus 22. The peripheral 23 is, for example, a printer, an image scanner, and/or a digital camera, or the like. It is not always necessary that the peripheral 23 is connected to the network apparatus 22 but a plurality of peripherals 23 can be also connected to one network apparatus 22.

Figure 2:
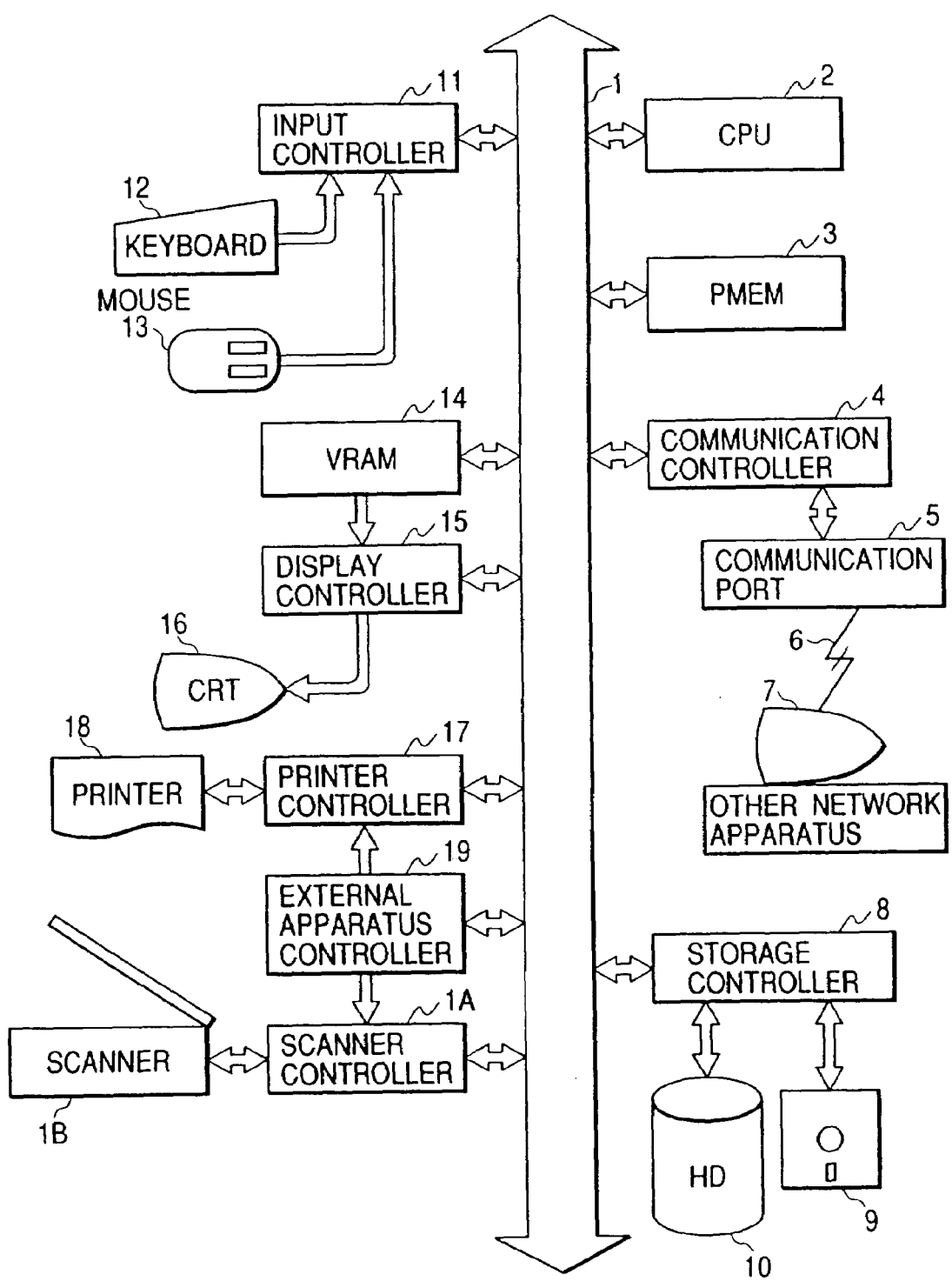
FIG. 2 is a block diagram showing a specific construction of network apparatuses and peripherals in FIG. 1.

FIG. 2 is a block diagram showing a specific construction of the network apparatuses 22 and peripherals 23 according to the embodiment.

A printer 1B and a scanner 1B correspond to the peripherals 23 (FIG. 1). The other constructing blocks correspond to the network apparatuses 22 (FIG. 1). The network apparatuses 22 are, for example, PCs.

Reference numeral 1 denotes a system bus. Each constructing block, which will be explained hereinbelow is connected to the system bus 1. Reference numeral 2 denotes a CPU (Central Processing Unit).

Reference numeral 3 denotes a program memory (referred to as a PMEM). Operating programs for various processes are properly selected/read out from a hard disk 10 and stored in the PMEM 3. The CPU 2 executes the operating programs stored in the PMEM 3.

Data inputted from a keyboard 12 is stored as code information into the PMEM 3 also serving as a text memory. Reference numeral 4 denotes a communication controller for controlling input/output data at a communication port 5.

A signal outputted from the communication port 5 is transmitted to a communication port of another network apparatus 7 on the network via a communication line 6 (communication network 21 in FIG. 1). The network apparatus 22 (FIG. 1) can input/output (transmit/receive) a signal to/from a printer or a scanner shared on the network by the communication controller 4.

Although the embodiment will be described with respect to a network such as an LAN or the like, the embodiment can be also applied to a case where the communication port 5 and communication line 6 which are connected to the communication controller 4 are general public lines.

Reference numeral 8 denotes a storage controller and 9 and 10 indicate disks for data files. For example, reference numeral 9 denotes a floppy disk and 10 indicates a hard disk.

Reference numeral 11 denotes an input controller. Input apparatuses such as keyboard 12, mouse 13, and the like are connected to the input controller 11. The operator issues an operation instruction or the like of the network apparatus by operating the keyboard 11.

The mouse 13 can be also allowed to function as a pointing device for instructing a modification of image information on a CRT (display apparatus) 16. Another pointing device can be also used in place of the mouse 13.

The mouse 13 can arbitrarily move a cursor on the CRT 16 in the X direction and Y direction, select a command icon on a command menu, and instruct a process. The mouse 13 can also instruct an edition target, a drawing position, and the like.

Reference numeral 14 denotes a video image memory (hereinafter, referred to as a VRAM); 15 a display controller; and 16 the CRT. Characters or an image which is displayed on the CRT 16 has been developed as bit map data in the VRAM 14.

Reference numeral 17 denotes a printer controller. The printer controller 17 performs an output control of data for the printer 18 connected to the self apparatus.

Reference numeral 1A denotes a scanner controller. The scanner controller 1A controls the scanner 1B connected to the self apparatus.

An image reading server apparatus and an image reading client apparatus are connected to the network. In the case where the network apparatus 22 (FIG. 1) functions as an image reading server apparatus, the scanner controller 1A and scanner 1B are necessary.

In the case where the network apparatus 22 (FIG. 1) functions as an image reading client apparatus, the network apparatus 22 (FIG. 1) can use the shared scanner controller 1A and scanner 1B provided for the image reading server apparatus through the self communication controller 4 and communication port 5 as mentioned above.

In the construction of FIG. 2, the scanner controller 1A and scanner 1B can be constructed as physically separate components or even if the scanner 1B is one component including the scanner controller 1A, a similar function is provided.

An external apparatus controller 19 controls the printer controller 17 and scanner controller 1A.

The operating programs stored in the program memory 3 can be also stored in the storage medium such as hard disk 10, floppy disk 9, or the like connected directly to the network apparatus 22 (FIG. 1).

The operating programs can be also stored in another network apparatus connected to the network. The operating programs of the embodiment can be supplied to the network apparatus through the storage medium such as floppy disk 9, hard disk 10, or the like or a network.

First Embodiment

The first embodiment will now be described hereinbelow.

Figure 3:
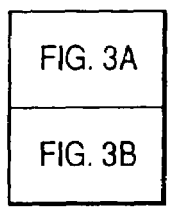
FIG. 3, composed of FIGS. 3A and 3B, is a flowchart showing processes of the network apparatus according to the first embodiment.
Figure 3A:
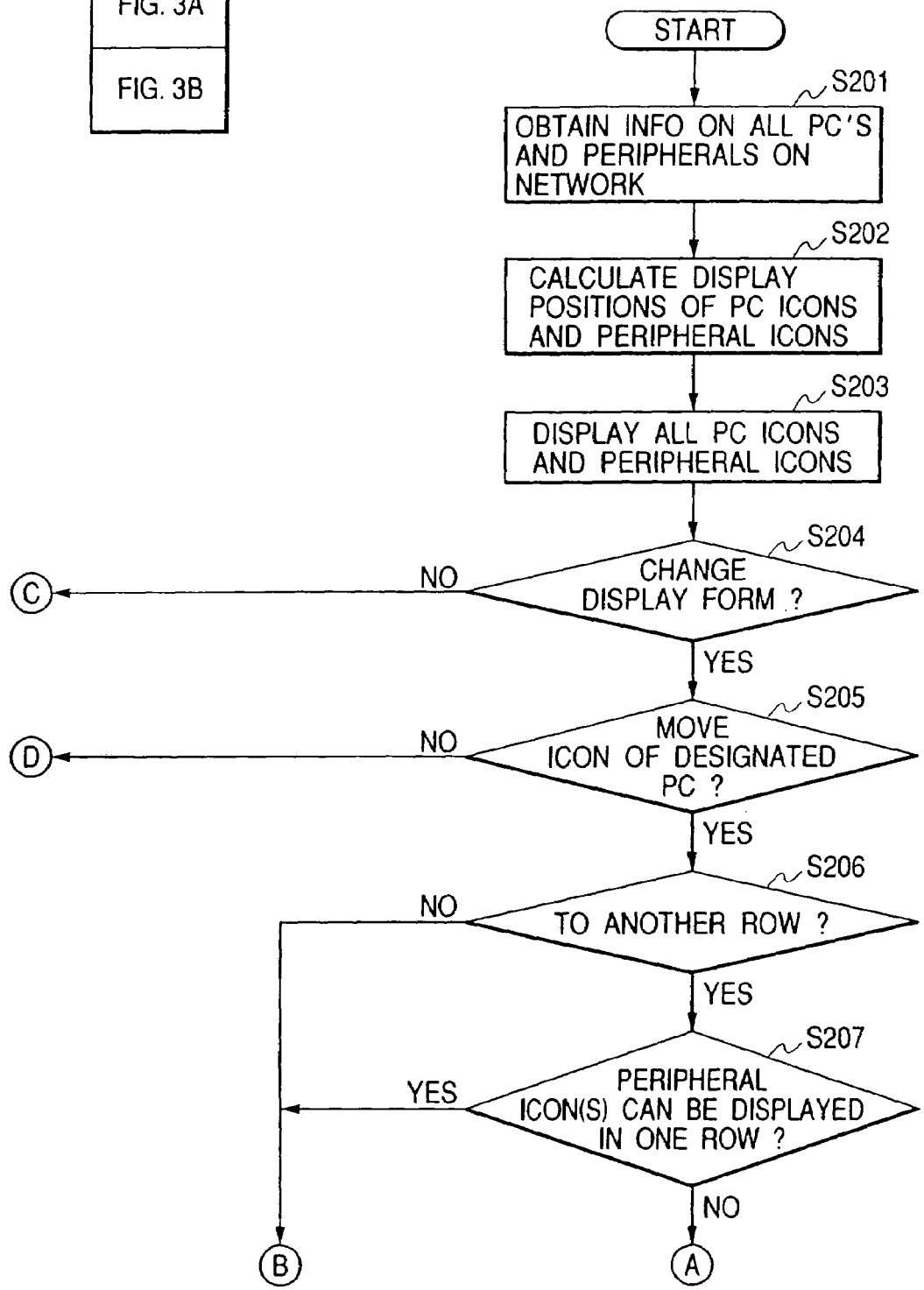

FIGS. 3A and 3B are flowcharts showing processes of the network apparatus according to the embodiment. The network apparatus (for example, personal computer) 22 to which the peripheral 23 has been connected will be described. First, it is assumed that the PC 22 is in a display state where the peripheral 23 is not displayed in expanded form on the CRT. The case where an expanded display is instructed in this display state will now be described.

First, connection information of all of the shared PCs and peripherals on the network and status information such as processing states or the like of the apparatuses are obtained in step S201. This information is stored in the PMEM 3 (FIG. 2).

Display positions where the PCs and peripherals are displayed on the CRT 16 (FIG. 2) are calculated on the basis of the obtained information in step S202.

All of the PCs and peripherals are displayed at predetermined positions on the same picture plane on the CRT 16 on the basis of the connection information and status information in step S203.

Figure 4:
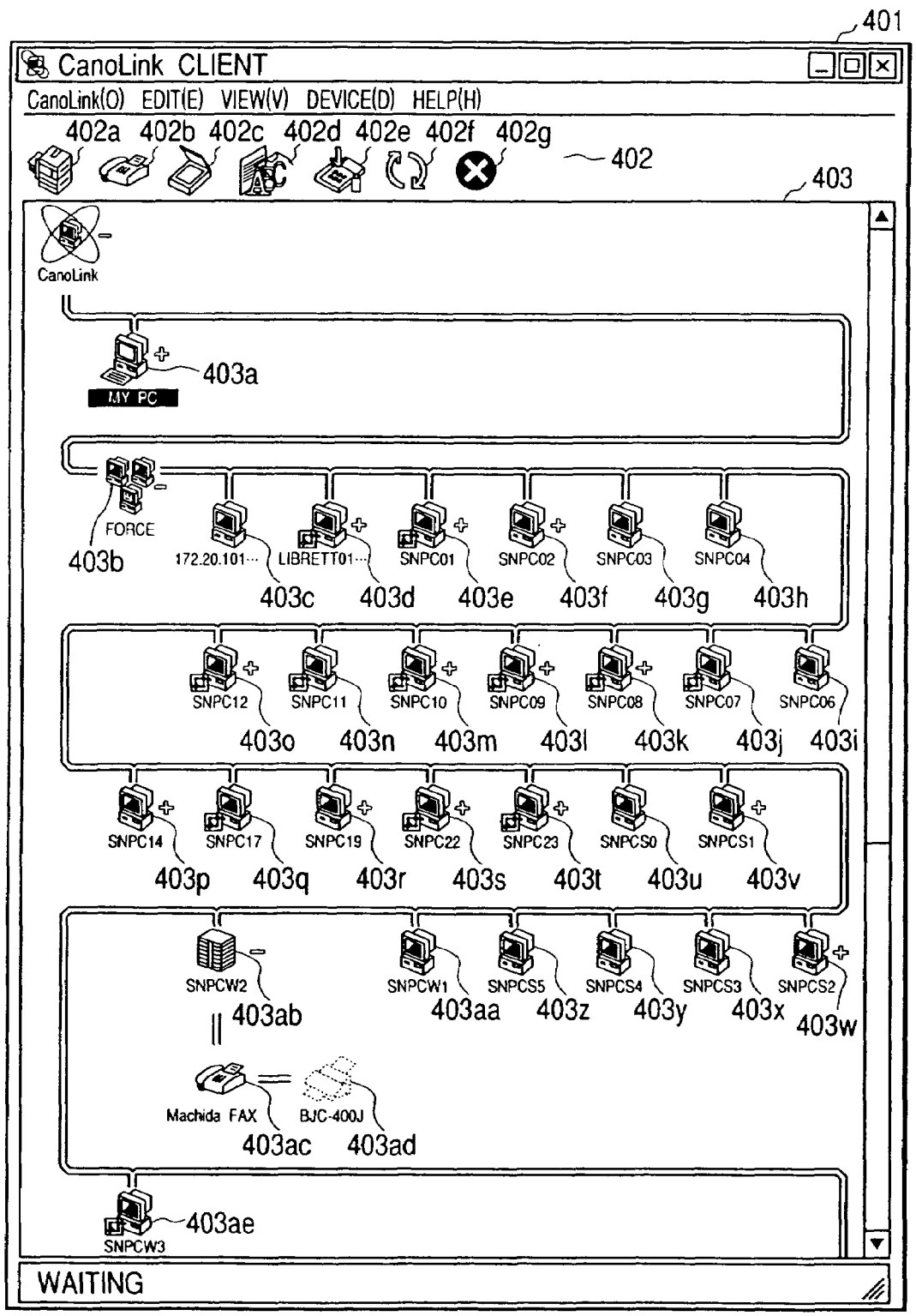
FIGS. 4, 5, 6, 7 and 8 are diagrams showing device map display screens of the first embodiment.

FIG. 4 shows an example of a screen display. Reference numeral 401 denotes a menu, 402 a tool bar, and 403 a main window for displaying icons indicative of the PCs and peripherals.

Icons 402a to 402g for allowing various functions to be executed are displayed in the tool bar 402. Each function of the icons 402a to 402g can be executed by operating the PC or peripheral.

For example, the icon 402a is an icon to execute the copying function for reading out the image data from the selected image scanner (image reading apparatus) and outputting the image data to the selected printer.

The icon 402b is an icon to execute the facsimile (FAX) function. The icon 402c is an icon to execute the reading function of the image data. The icon 402d is an icon to execute the function for reading the image data and performing an OCR process. The icon 402e is an icon to execute the function for managing FAX reception data and distribution data. The icon 402f is an icon to execute an updating process of information. The icon 402g is an icon to stop the updating process.

The above status information will now be described. Icons 403a to 403ae are icons showing the PCs and peripherals shared on the network. The icons 403a to 403ae are displayed as icons (display forms) of device kinds in accordance with device kinds such as PC, printer, image scanner, FAX modem, and the like. The icons 403a to 403ae are changed in dependence on a processing state such as "during the processing", "error generation", or the like and displayed.

The icon 403a is an icon showing the self apparatus. The icon 403b is an icon showing a domain in which the self PC is in a logon state. Since the self PC is a special apparatus, it is displayed so as to be distinguished from the other PCs.

The icon 403ad denotes the peripheral in which no driver is installed although it is shared on the network. The icon 403ad is displayed in gray. Since the peripheral in which the driver has been installed is displayed by an icon in a clear color, the presence or absence of the installed driver can be easily known. The above information is the status information.

Although the icons 403d, 403e, and the like denote the peripherals connected to the self PC, a "+" (plus) mark is displayed on the icons 403d, 403e, and the like in order to show the fact that the peripherals are not displayed in expanded form on the screen.

As for the icon 403ab, a "−" (minus) mark is displayed on the icon 403ab in order to show the fact that the peripheral connected to the self PC (apparatus) has been expanded on the screen.

As for the icons 403c, 403g, and the like, no mark is displayed on the icons 403c, 403g, and the like in order to show the fact that no peripheral is connected to the self PC (apparatus).

As mentioned above, the connecting states and statuses of all of the PCs and peripherals on the network can be confirmed on the screen. In this example, although all icons are not displayed due to a restriction of a size of screen, all of the PCs and peripherals can be confirmed by using the scroll bar arranged on the side of the screen.

Subsequently, whether a display change has been instructed or not is discriminated in step S204 in FIG. 3A. If there is no instruction for the display change, the processing routine is finished. If there is the change instruction, step S205 follows.

As an operating method of the change instruction, for example, there is a method of instructing the change by clicking the "+" mark displayed on the icon 403f showing the PC by the mouse. By performing such a change instruction, the icons of the peripherals connected to the icon 403f indicative of the PC are displayed. For example, as shown by the icon 403ab, the connected peripheral is displayed in expanded form.

In step S205, whether it is necessary to change (move) the display position of the icon of the designated PC or not is discriminated on the basis of the information of the peripherals connected to the PC to which the display change has been designated and the current display position.

If there is no need to change the display positions, step S209 follows. In step S209, the display positions of the peripherals connected to the self apparatus are calculated, obtained, and displayed. Step S212 follows.

In step S212, whether it is necessary to move the display positions of the other PCs and the peripherals connected thereto or not is discriminated. If it is necessary to move, step S213 follows and the display positions after the movement are again calculated, obtained, and displayed.

Figure 5:
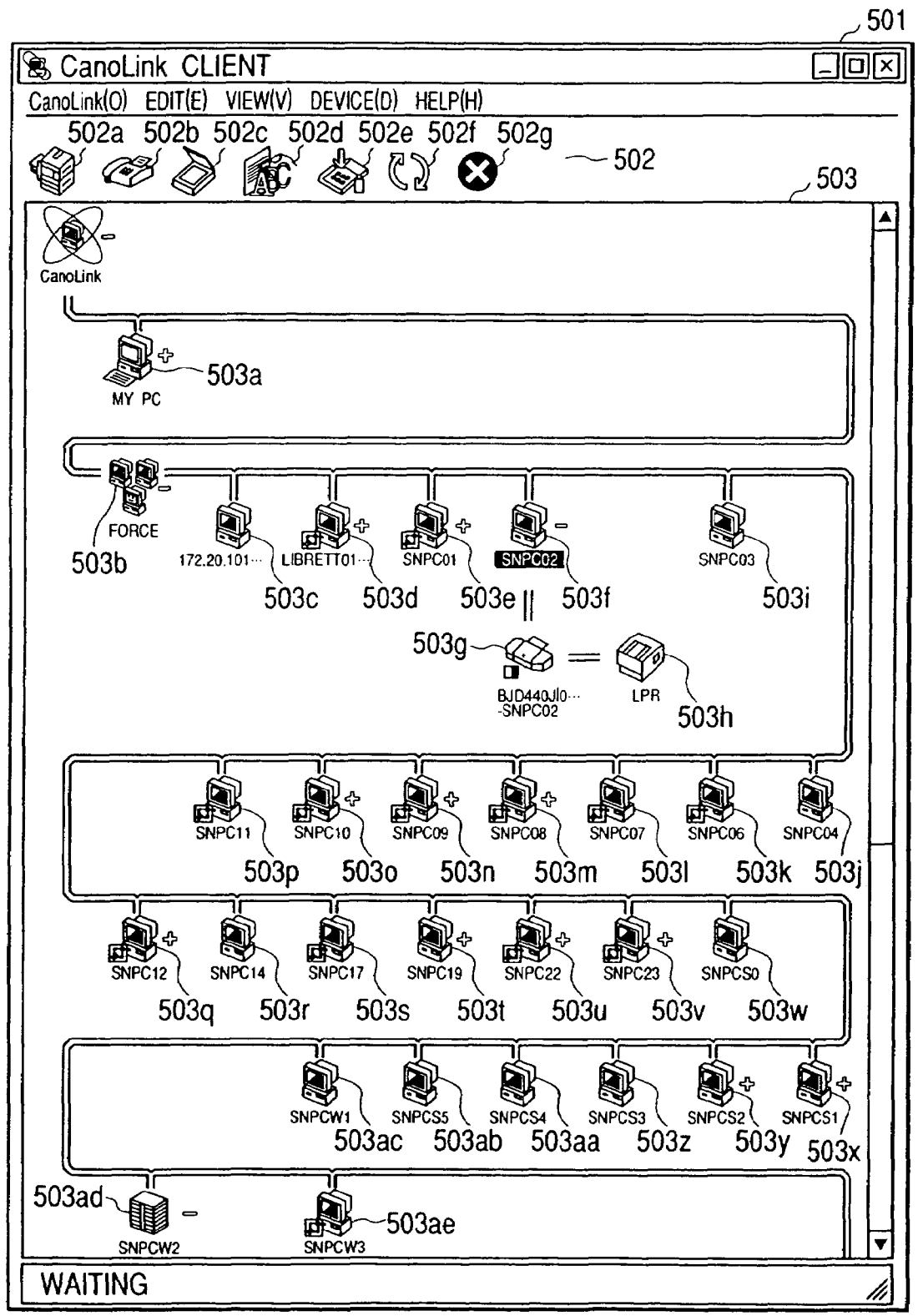

FIG. 5 shows an example of a screen display. For example, when the "+" mark displayed on the icon 403f showing the PC in FIG. 4 is clicked with the mouse, the icon 403f is displayed in expanded form. When the icon 403f of the PC is displayed in expanded form, the display position of an icon 503f of the PC in FIG. 5 corresponding to the icon 403f is not changed.

The reasons will now be described. In the row of the icon 503f, the icons of the PCs are sequentially arranged and displayed from the left direction for a network line. The peripherals connected to the icon 503f of the PC are two icons 503g and 503h of printers. Therefore, this is because it is possible to display the icons in a manner such that the icons 503g and 503h of the printers are connected to the icon 503f of the PC without changing the display position of the icon 503f of the PC.

If the display positions have to be changed (moved) in step S205 in FIG. 3A, step S206 follows.

In step S206, whether the display row of the designated PC (apparatus) has to be changed or not is discriminated. If the display row of the designated PC (apparatus) is not changed, step S208 follows. The display position of the PC (apparatus) is calculated, obtained, and displayed.

Figure 6:
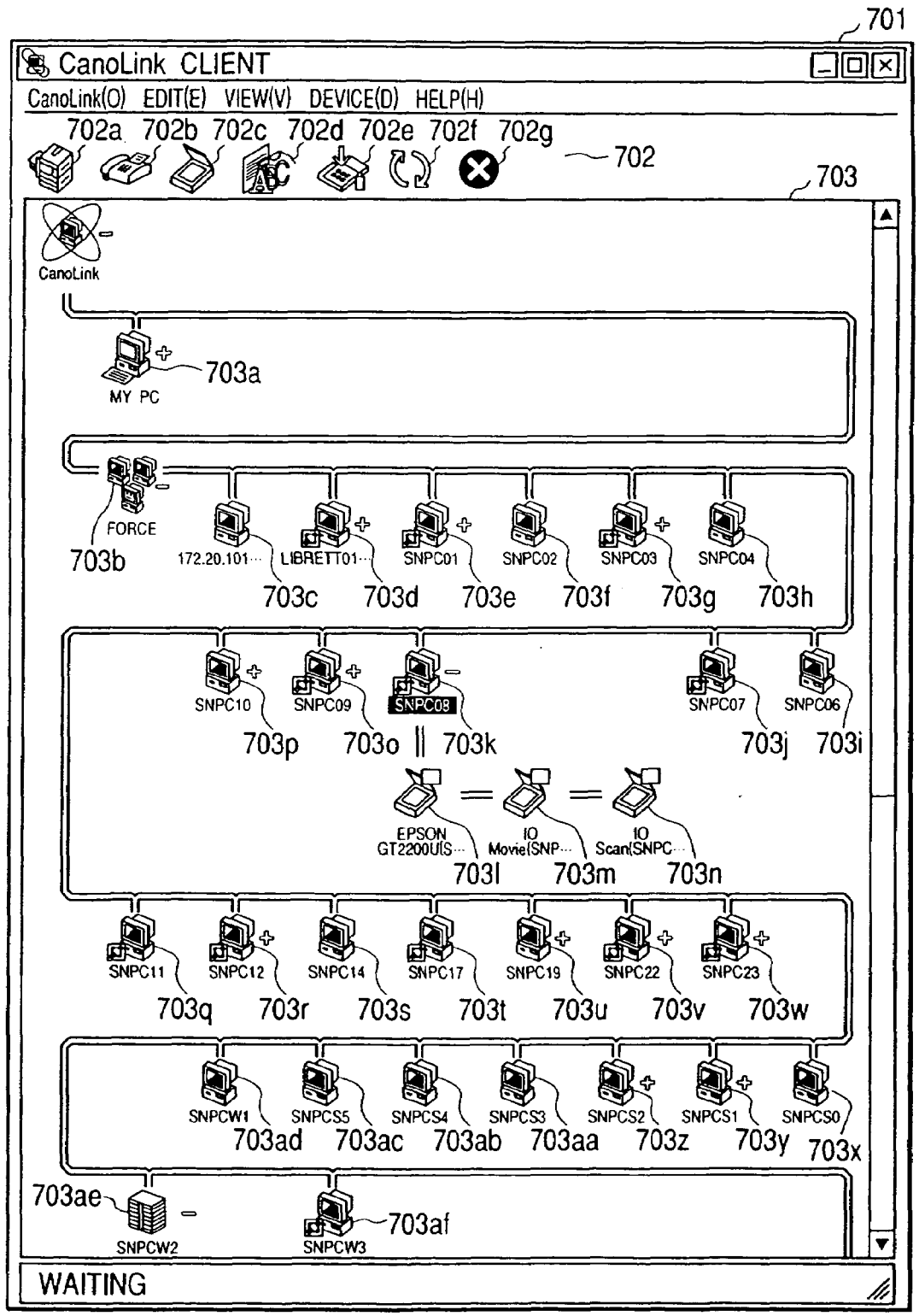

FIG. 6 shows an example of a screen display. For example, when the "+" mark displayed on the icon 403k showing the PC in FIG. 4 is clicked with the mouse, the icon 403k is displayed in expanded form. When the peripherals connected to the icon 403k of the PC are displayed in expanded form, a display position of an icon 703k of the PC in FIG. 6 corresponding to the icon 403k is moved to the left and the icon is displayed there.

The reasons will now be described. In the row of the icon 703k, the PCs are sequentially arranged and displayed from the right direction for a network line. Three icons 703l, 703m, and 703n of image scanners are connected to the icon 703k of the PC. Therefore, unless the display position of the icon 703k, of the PC is moved to the left, the three icons 703l, 703m, and 703n of image scanners cannot be displayed. As shown in FIG. 6, by moving the icon 703k of the PC to the left and displaying there, the icons 703l, 703m, and 703n of image scanners connected to the icon 703k can be displayed.

If the display row has to be changed (moved) in step S206 in FIG. 3A, step S207 follows.

In step S207, whether the peripherals connected to the PC (apparatus) to which the change has been instructed can be displayed in one row or not is discriminated. If they can be displayed in one row, step S208 follows and the display position of each peripheral is calculated, obtained, and displayed.

Figure 7:
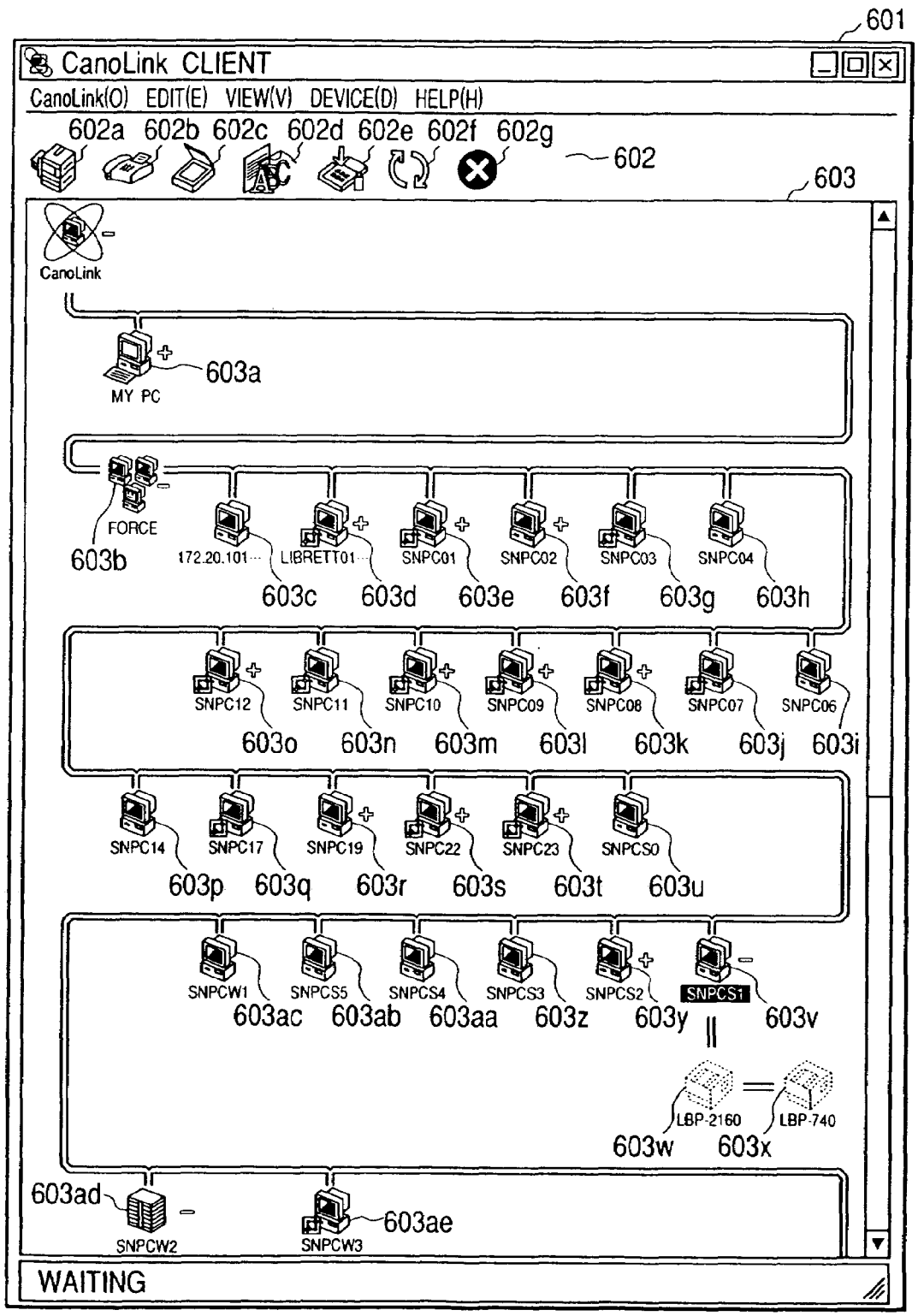

FIG. 7 shows an example of a screen display. For example, when the "+" mark displayed on the icon 403v showing the PC in FIG. 4 is clicked with the mouse, the icon 403v is displayed in expanded form. When the peripherals connected to the icon 403v of the PC are displayed in expanded form, a display row of an icon 603v of the PC in FIG. 7 corresponding to the icon 403v is moved downward by one row and the icon is displayed.

The reasons will be described. Two icons 603w and 603x of printers are connected to the icon 603v of the PC. Unless the display position of the icon 603v of the PC is moved, the icons 603w and 603x of printers connected to the icon 603v cannot be displayed. By pushing out the icon 603v of the PC to the lower row and displaying, the icons 603w and 603x of printers connected to the icon 603v can be displayed.

If the peripherals cannot be displayed in one row in step S207 in FIG. 3A, step S210 follows. In step S210, display positions of the PCs (apparatuses) to which the change has been instructed are calculated, obtained, and displayed. Further, step S211 follows. In step S211, display positions are calculated, obtained, and displayed so that the peripherals connected to the PCs (apparatuses) to which the change has been instructed are displayed in plural rows.

Figure 8:
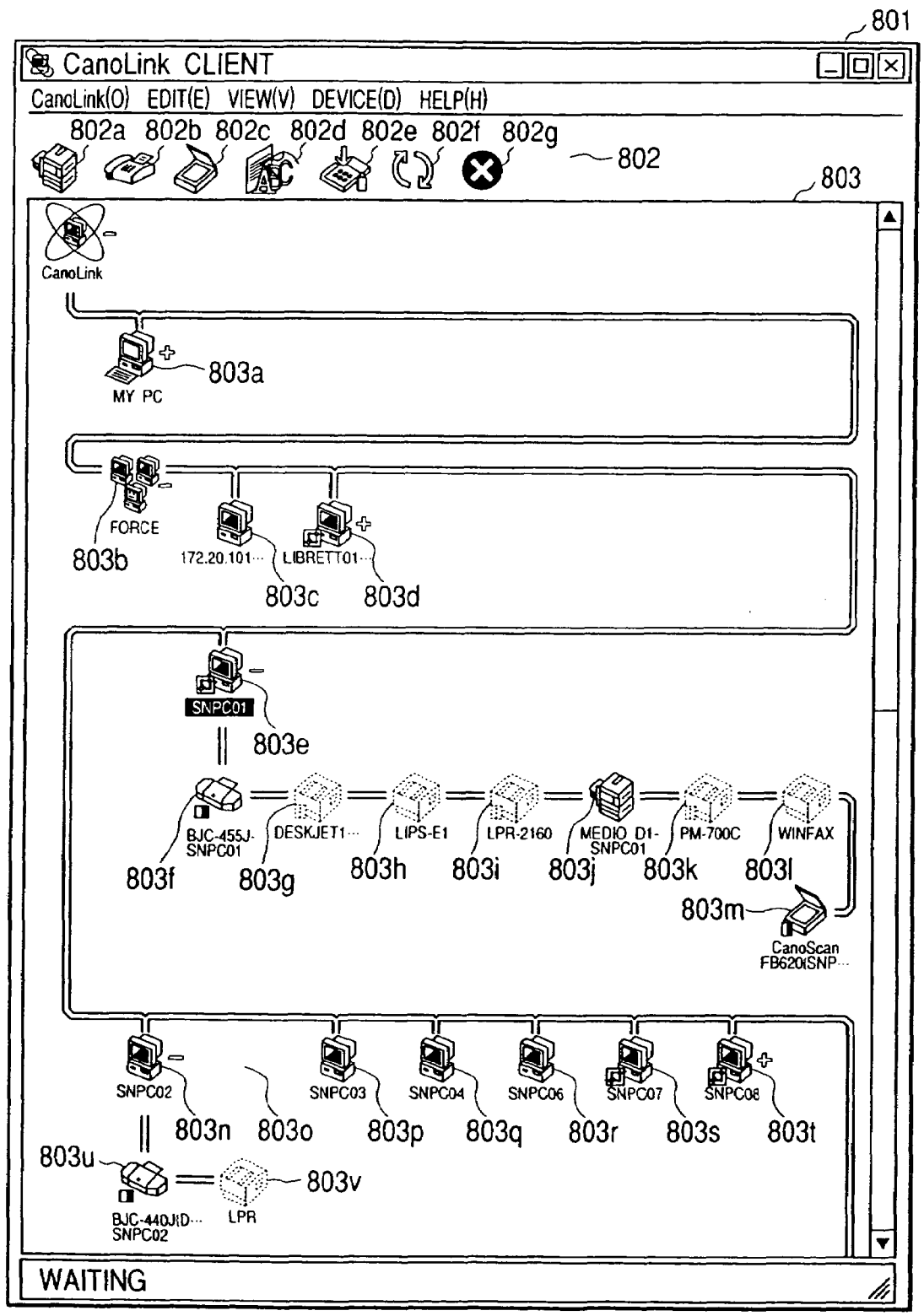

FIG. 8 shows an example of a screen display. For example, the "+" mark displayed on the icon 403e showing the PC in FIG. 4 is clicked with the mouse, the icon 403e is displayed in expanded form. When the peripherals connected to the icon 403e of the PC are displayed in expanded form, a display row of an icon 803e of the PC in FIG. 8 corresponding to the icon 403e is moved downward. The peripherals connected to the icon 803e are displayed in two rows.

The reasons will now be described. The peripherals connected to the icon 803e of the PC are eight peripherals of icons 803f, 803g, 803h, 803i, 803j, 803k, and 803l of printers and an icon 803m of an image scanner. A display space of a width of a display window on the screen or more is necessary to display the icons of those eight peripherals, so that all of them cannot be fully displayed in one row. In such a case, by displaying the peripherals in such a manner that the peripherals are folded back and connected, the icons of those eight peripherals can be displayed in the display window of a predetermined width.

Since the display positions of the icons of the PCs to which the change was instructed have been calculated and determined, whether it is necessary to move the display positions regarding the other apparatuses (PCs and/or peripherals) or not is similarly discriminated in step S212. If it is necessary to move the display positions, step S213 follows and the display positions of the other apparatuses are again calculated, obtained, and displayed. The processing routine is finished.

Figure 9:
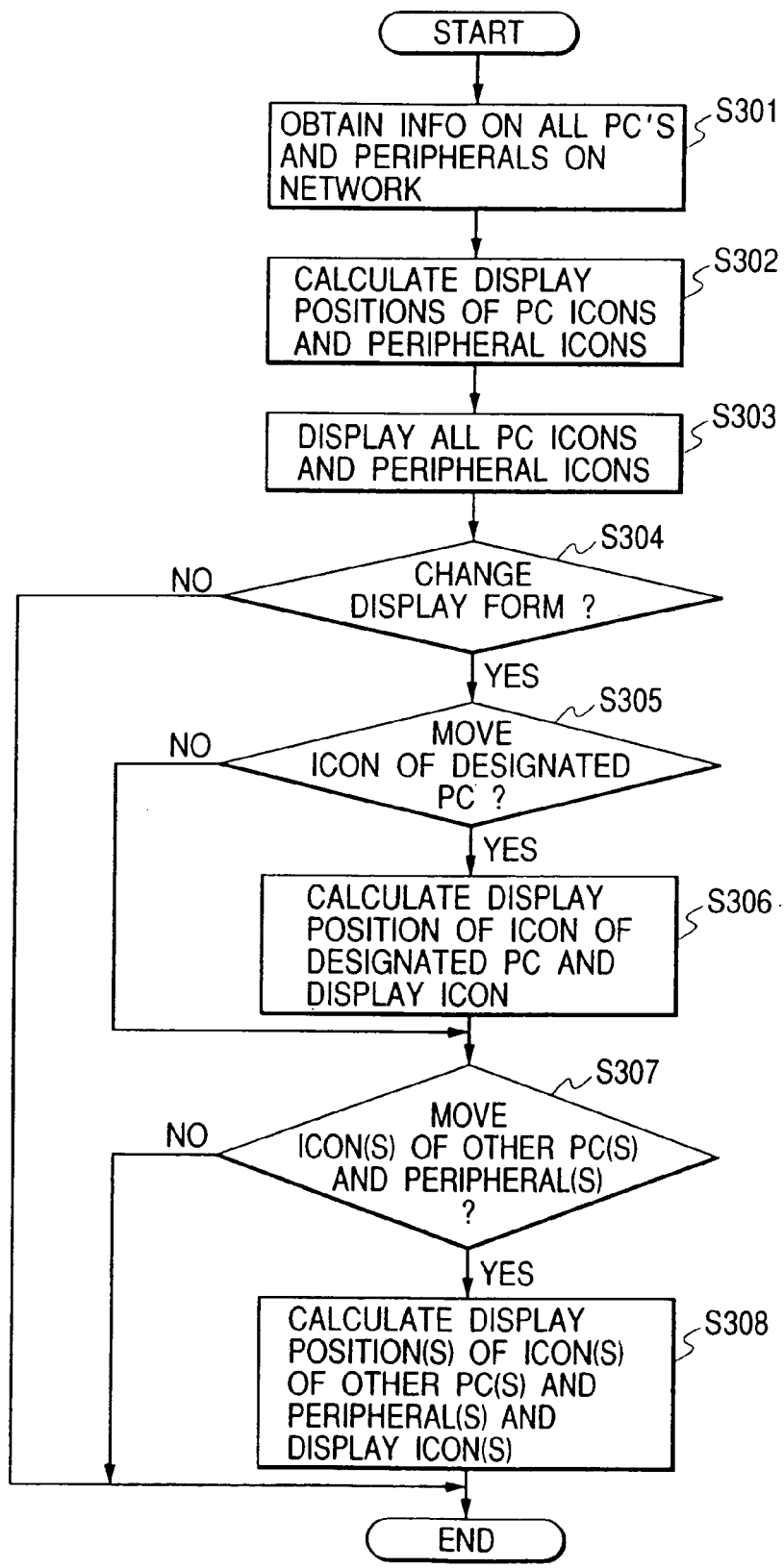
FIG. 9 is a flowchart showing a reduced display process according to the embodiment.

FIG. 9 is a flowchart showing a reduced display process according to the embodiment. In this flowchart, a case where a reduced display has been instructed from the display state where the peripherals connected to the PCs were displayed in expanded form will be described.

First, steps S301 to S304 are similar to steps S201 to S204 in FIG. 3A.

Subsequently, in step S304, whether the display change has been instructed or not is discriminated. If the display change is not instructed, the processing routine is finished. If there is the display change instruction, step S305 follows.

In step S305, whether the display positions of the PCs (apparatuses) to which the change has been instructed have to be changed (moved) or not is discriminated. If it is necessary to change them, step S306 follows and the display positions of the PCs (apparatuses) to which the change has been instructed are calculated, obtained, and displayed. Step S307 follows. If there is no need to change them, no process is performed and next step S307 follows.

In step S307, whether it is necessary to change the display positions of the other apparatuses (PCs and/or peripherals) due to the display change of the PCs (apparatuses) to which the change has been instructed or not is discriminated. If it is necessary to change the display positions, step S308 follows. The display positions of the apparatuses other than the apparatuses to which the change has been instructed are calculated, obtained, and displayed. After that, the processing routine is finished. If there is no need to change the display positions, step S308 is bypassed and the processing routine is finished.

By executing the processes of the flowchart, for example, the following display change can be performed. For instance, by clicking a "−" mark displayed on the icon 503f of the PC shown in FIG. 5 by the mouse, the icon 403f in FIG. 4 corresponding to the icon 503f in FIG. 5 is displayed in reduced form as shown in FIG. 4. The "+" mark is displayed on the icon 403f by the reduced display and the icons of the peripherals connected to the icon 403f are erased.

Similarly, by clicking a "−" mark displayed on the icon 703k of the PC shown in FIG. 6 by the mouse, the icon 403k in FIG. 4 corresponding to the icon 703k in FIG. 6 is displayed in reduced form as shown in FIG. 4.

Similarly, by clicking a "−" mark displayed on the icon 603v of the PC shown in FIG. 7 by the mouse, the icon 403v in FIG. 4 corresponding to the icon 603v in FIG. 7 is displayed in reduced form as shown in FIG. 4.

Similarly, by clicking a "−" mark displayed on the icon 803e of the PC shown in FIG. 8 by the mouse, the icon 403e in FIG. 4 corresponding to the icon 803e in FIG. 8 is displayed in reduced form as shown in FIG. 4.

As mentioned above, when the peripherals are connected to the PC, the icon of the PC can be displayed in reduced form or displayed in expanded form. In case of the reduced display, the "+" mark is displayed on the icon of the PC and the icons of the peripherals connected to the PC are not displayed.

When the display change is instructed by clicking the "+" mark on the icon of the PC by the mouse, the icon can be displayed in expanded form. In case of the expanded display, the "−" mark is displayed on the icon of the PC and the icons of the peripherals connected to the PC are displayed in expanded form.

On the other hand, when the display change is instructed by clicking the "−" mark on the icon of the PC by the mouse, the icon can be displayed in reduced form.

Whether it is necessary to change the display position of the icon of the PC to which the change has been instructed in accordance with the number of peripherals connected to the PC to which the change has been instructed or not is discriminated at the time of the expanded display. By changing the display position of the icon, even if the number of peripherals is large, the peripherals can be efficiently displayed at the proper positions.

When the number of peripherals is small, there is no need to change the display row of the icons of the PCs. However, when the number of peripherals is large, by changing the display positions of the icons of the PCs, for example, downward by one row, a wide display space is assured and a number of peripherals can be displayed.

When the number of peripherals is small, the peripherals are arranged and displayed in one row. When the number of peripherals is large, the peripherals are folded back and arranged and displayed in plural rows. By folding back and displaying the peripherals in the plural rows, a number of peripherals can be displayed.

When the icons are displayed in expanded form, there is a case where the display positions of the PCs and/or peripherals in the display row under the present row have to be moved further downward by such an influence. In this case, the display positions of the PCs and/or peripherals are calculated again and can be efficiently displayed at proper positions.

When the icons are displayed in expanded form, it is possible to construct the apparatus in a manner such that the icons of only the image input apparatuses (image scanners) and image output apparatuses (printers) are displayed in expanded form and the other apparatuses (for example, storing apparatuses and the like) are not displayed in expanded form or the icons of only the peripherals which have been shared and set for the other terminals on the network are displayed in expanded form.

Further, it is also possible to construct the apparatus in a manner such that the user is allowed to designate an expanded display mode such as mode for expanding only the image scanners, mode for expanding only the printers, or the like and the icons are displayed in expanded form on the basis of the designated mode.

As the number of peripherals which are used for calculation of the display positions in this case, the total number of peripherals which meet the conditions of the expanded display among the connected peripherals is used.

Even when the number of peripherals connected to the PC is large, the icon of the PC can be efficiently displayed in expanded form or displayed in reduced form on the same picture plane. The connecting states of the PCs and peripherals can be easily known.

A status of each apparatus can be easily known by obtaining the status information of each apparatus connected to the network and displaying the icon of each apparatus in accordance with the status information.

Second Embodiment

The second embodiment will now be described hereinbelow.

In the second embodiment, there is shown an example in which in response to the operation for dragging a device icon to a PC icon on a device map display screen, the icons of the devices locally connected to the PC corresponding to the PC icon are displayed in expanded form and the display position of each icon on the device map is calculated again and displayed in accordance with the expanded display.

Figure 10:
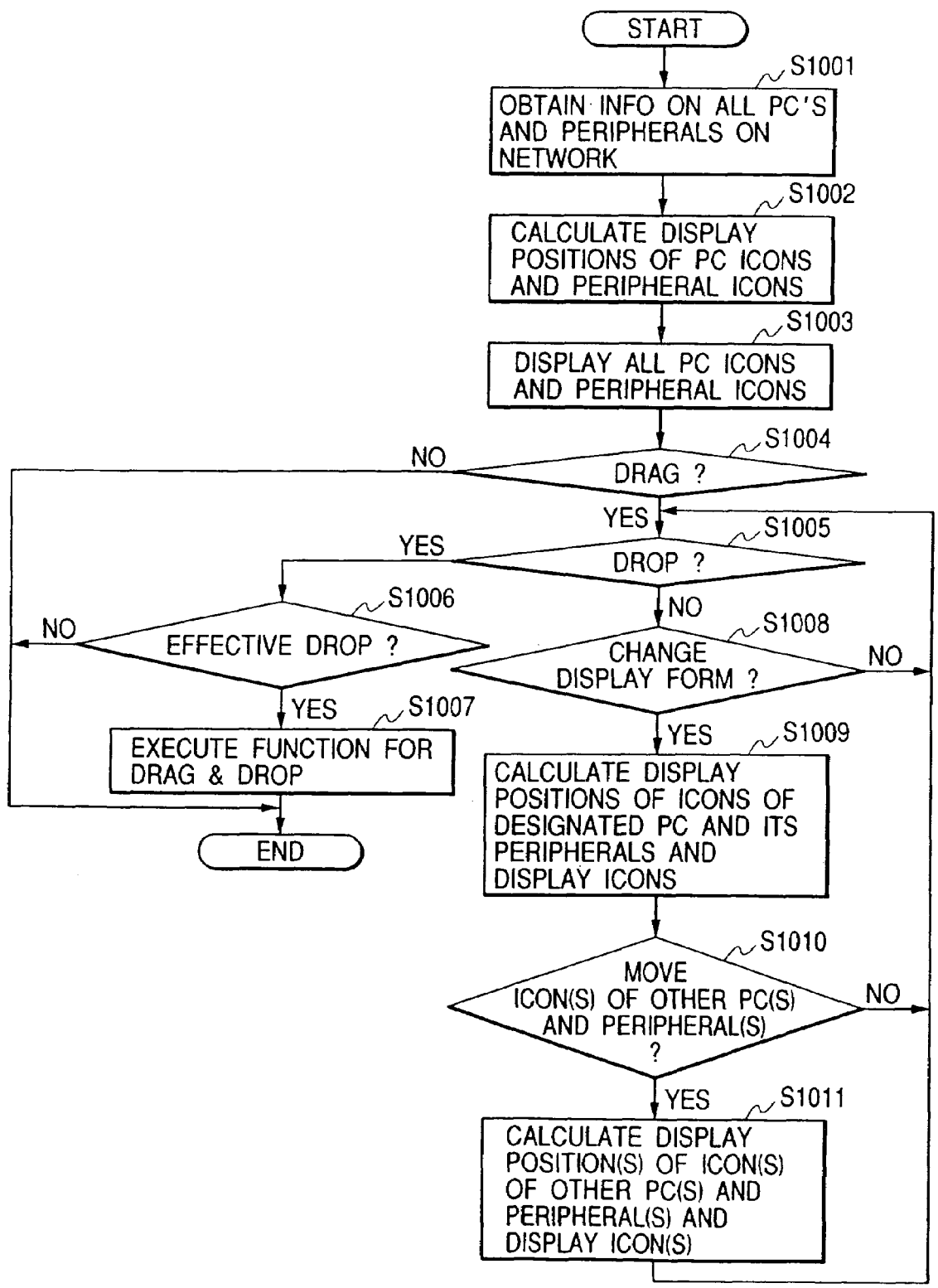
FIG. 10 is a flowchart showing processes of a network apparatus according to the second embodiment.

FIG. 10 is a flowchart showing processes of the network apparatus 22 according to the embodiment. A case where the network apparatus 22 is the PC will be described as an example hereinbelow.

First, in step S1001, the connection information of all of the shared PCs 22 and peripherals 23 on the communication network 21 and the status information such as processing states or the like of those apparatuses are obtained. The information is stored in the PMEM 3 (FIG. 2).

Subsequently, in step S1002, the positions where the PCs and peripherals are displayed on the display screen of the CRT 16 (FIG. 2) are calculated on the basis of the obtained information.

In step S1003, all of the PCs and peripherals are displayed at predetermined positions on the same picture plane of the CRT 16 on the basis of the connection information and the status information.

Figure 11:
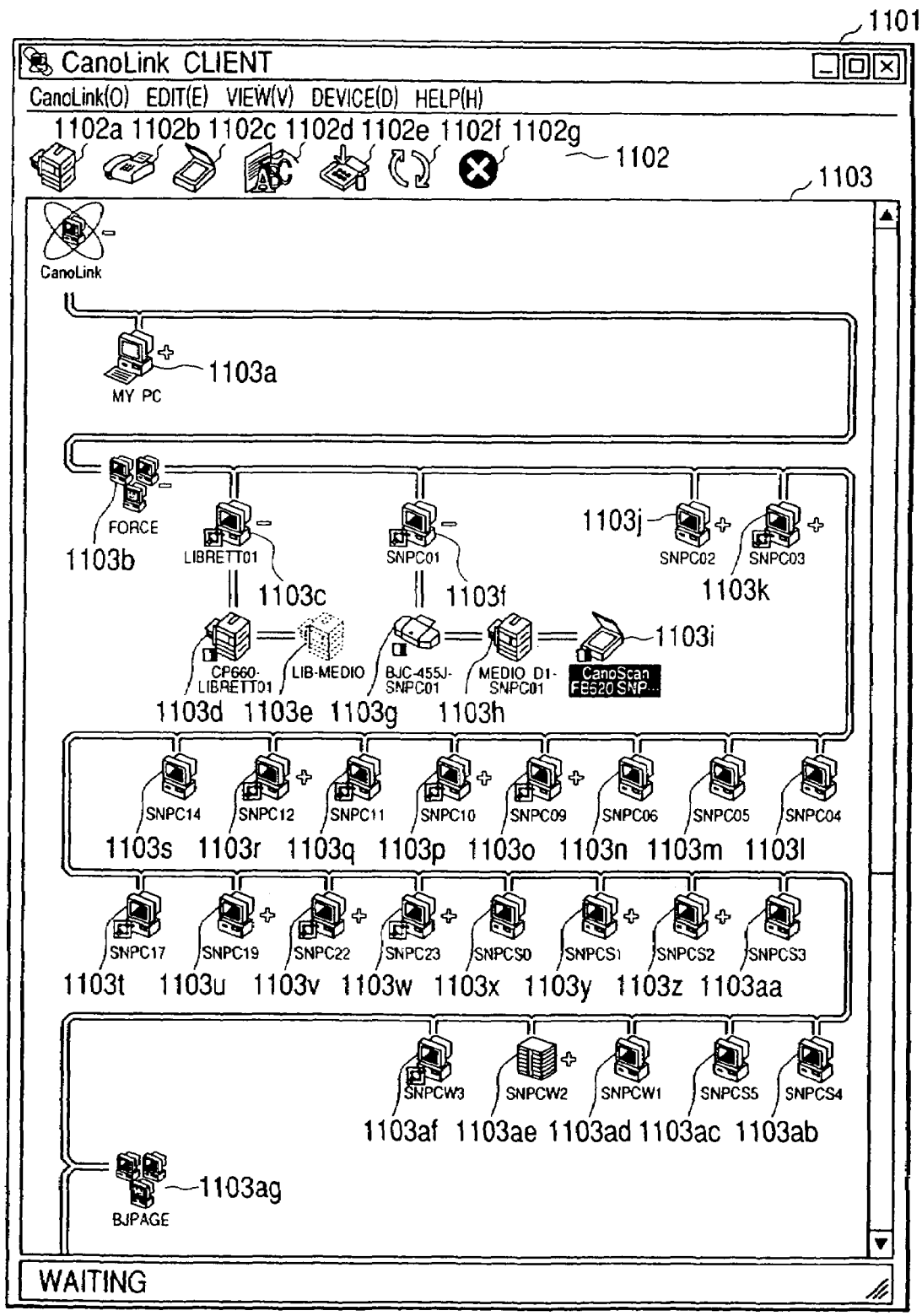
FIGS. 11, 12 and 13 are diagrams showing device map display screens of the second embodiment.

FIG. 11 shows an example of a display screen. Reference numeral 1101 denotes a menu; 1102 a tool bar; and 1103 a main window for displaying the icons of the PCs and peripherals.

Icons 1102a to 1102g for allowing various functions to be executed are displayed on the tool bar 1102. Each function of the icons 1102a to 1102g can be executed by operating the PC or peripheral.

For example, the icon 1102a is an icon to execute the copying function for reading image data from the selected image scanner (image reading apparatus) and outputting the image data to the selected printer.

The icon 1102b is an icon to execute the FAX function. The icon 1102c is an icon to execute the reading function of the image data. The icon 1102d is an icon to execute the function for reading the image data and performing the OCR process. The icon 1102e is an icon to execute the function for managing FAX reception data and distribution data. The icon 1102f is an icon to execute the updating process of information. The icon 1102g is an icon to stop the updating process.

The status information will now be described. Icons 1103a to 1103ag are icons showing PCs, peripherals, and domains which are shared on the network. The icons 1103a to 1103ag are displayed as icons (display forms) of device kinds in accordance with the device kinds such as PC, printer, image scanner, FAX modem, and the like. The icons 1103a to 1103ag are changed in accordance with a processing state such as "during the processing", "error generation", or the like and displayed.

The icon 1103a is an icon showing the self PC (apparatus). The icon 1103b is an icon showing the domain in which the self PC is in the logon state. Since the self PC is a special apparatus, it is displayed so as to be distinguished from the other PCs.

Although the icon 1103e is shared on the network, it is a peripheral in which no driver is installed, so that the icon 1103e is displayed in gray. Since the peripheral in which the driver has been installed is displayed by an icon in a clear color, whether the driver has been installed or not can be easily known. The above information is the status information.

Although the icons 1103j, 1103k, and the like denote the peripherals connected to the self PC (network apparatus), a "+" (plus) mark is displayed on the icons 1103j, 1103k, and the like in order to show the fact that the peripherals are not displayed in expanded form on the screen. The icons 1103j, 1103k, and the like are displayed in reduced form.

As for the icons 1103c, 1103f, and the like, a "−" (minus) mark is displayed on the icons 1103c, 1103f, and the like in order to show the fact that the peripherals connected to the self PC (network apparatus) have been expanded on the screen. The icons 1103c, 1103f, and the like are displayed in expanded form.

When the peripherals are connected to the self PC, the "+" mark or the "−" mark is displayed on the icon of the self PC. Either the reduced display or the expanded display can be selected every PC.

As for the icons 1103s, 1103q, and the like, no mark is displayed on the icons 1103s, 1103q, and the like in order to show the fact that no peripheral is connected to the self PC (apparatus).

As mentioned above, the connecting states and statuses of all of the PCs and peripherals on the network can be confirmed on the screen. In this example, although all icons are not displayed due to a restriction of a size of screen, all of the PCs and peripherals can be confirmed by using the scroll bar arranged on the side of the screen.

Subsequently, whether the dragging operation has been performed to the peripheral or network apparatus by using, for example, the mouse 13 (FIG. 2) or not is discriminated in step S1004. The dragging operation is an operation which is executed when the operator moves a mouse pointer with the mouse button depressed.

In the case where the dragging operation is not performed, the processing routine is finished. If the dragging operation is performed, step S1005 follows. In step S1005, whether the dropping operation has been performed to the peripheral or network apparatus to which the dragging operation was being performed or not is discriminated. The dropping operation is an operation which is executed when the operator removes the mouse button.

When the dropping operation is performed, step S1006 follows. In step S1006, whether the dropping operation is an effective process or not is discriminated. If it is not effective, the processing routine is finished. If it is effective, step S1007 follows.

In step S1007, the functions corresponding to the dragging operation and the dropping operation are executed. For example, in FIG. 11, if the icon 1103i of the image scanner is subjected to the dragging and dropping operations so as to be moved to the position of the icon 1103d of the printer, the image data is read out from the image scanner shown by the icon 1103i and outputted to the printer shown by the icon 1103d. That is, the copying function from the image scanner to the printer is executed. After that, the processing routine is finished.

If it is determined in step S1005 in FIG. 10 that the dropping operation is not performed after the dragging operation, step S1008 follows. In step S1008, the present position of the mouse pointer of the mouse 13 is used as a reference and whether the display form of the icon at the present position is changed or not is discriminated. The display form is, for example, the expanded display or reduced display.

As a discriminating method, for example, in FIG. 11, as for the icon 1103f of the PC, the icons 1103g, 1103h, and 1103i of the peripherals connected to the self PC are displayed in expanded form. In the case where the mouse pointer is located at the position of the icon 1103f, since the apparatus is in a state where the dragging operation can be performed to the icons 1103g, 1103h, and 1103i of all of the peripherals connected to the icon 1103f of the PC, there is no need to change the display form of the icon 1103f.

As for the icon 1103j of the PC or the like, although the peripheral is connected to the self PC, the peripheral is not displayed in expanded form but displayed in reduced form. In such a case, the dragging operation cannot be performed to such a peripheral. In this case, to display the icon 1103j in expanded form, it is necessary to change the display form from the reduced form to the expanded form. By displaying the peripherals connected to the icon 1103j of the PC in expanded form, the dragging operation can be performed to the peripherals connected to the icon 1103j of the PC.

If it is determined in step S1008 that there is no need to change the display form, the processing routine is returned to step S1005. If it is determined that it is necessary to change the display form, the processing routine advances to step S1009.

In step S1009, the display positions of the PC (network apparatus) where the mouse pointer is located and the peripherals connected to such a PC are calculated and displayed. Step S1010 follows.

In step S1010, whether the display positions of the other PCs (network apparatuses) and/or peripherals are corrected (changed) or not is discriminated. If it is unnecessary to correct, the processing routine is returned to step S1005.

Figure 12:
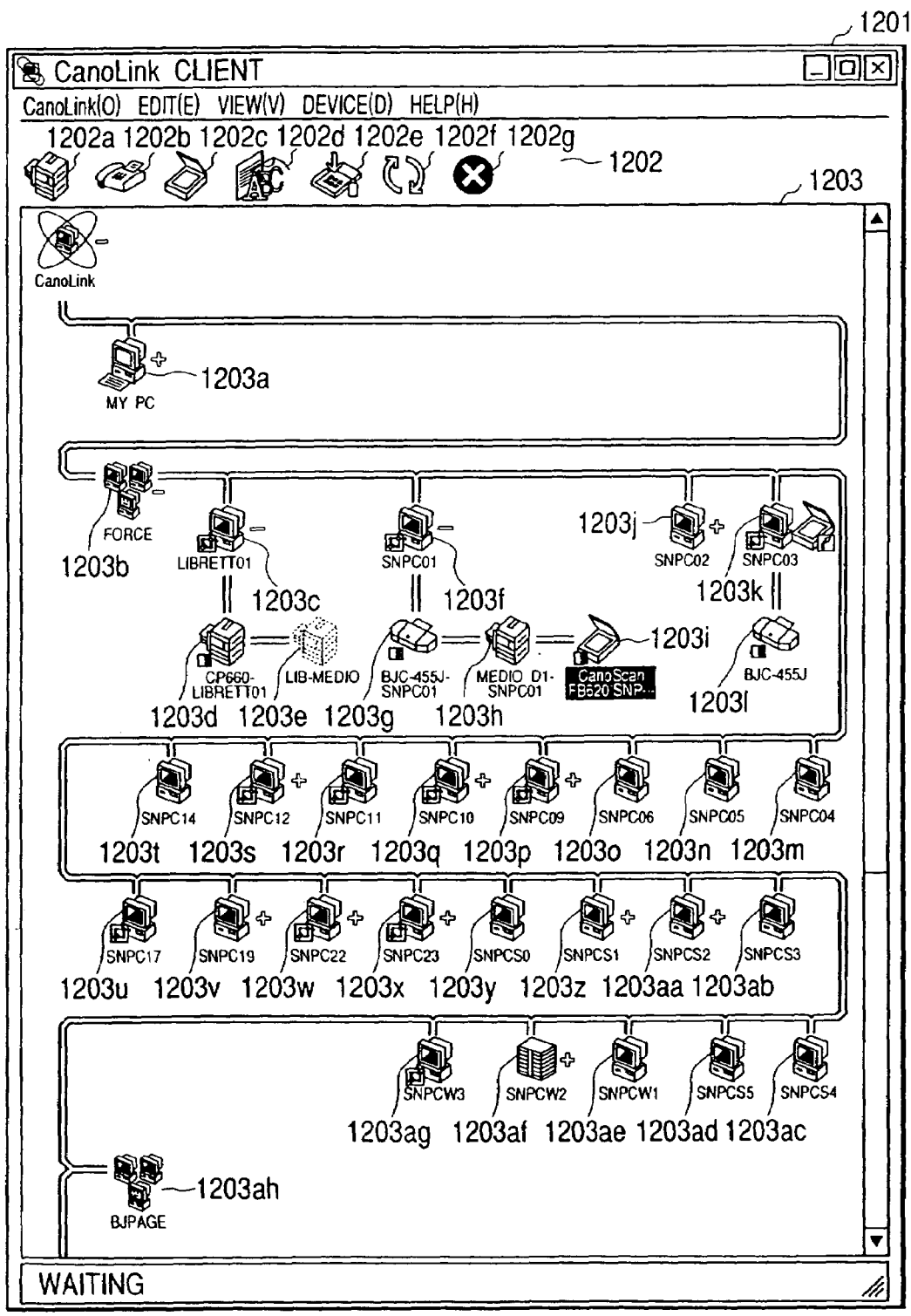

FIG. 12 shows an example of a display screen. It shows a case where the dragging operation is performed to the icon 1103*i* of the image scanner shown in FIG. 11 and the mouse pointer of the mouse 13 is moved to the position of the icon 1103*k* of the PC. By moving the mouse pointer to such a position, the display form shown in FIG. 11 is changed to the display form shown in FIG. 12. The icon of the image scanner is displayed on the icon 1203*k* of the PC in FIG. 12 corresponding to the icon 1103*k* in FIG. 11. The icon 1203*k* corresponding to the icon 1103*k* is displayed in expanded form. That is, the icon 1203*l* of the printer connected to the icon 1203*k* of the PC is displayed in expanded form.

If it is determined in step S1010 in FIG. 10 that it is necessary to correct the display positions of the other PCs (network apparatuses) and/or the peripherals, step S1011 follows. In step S1011, the display positions of the other PCs and/or peripherals whose display positions need to be corrected are calculated again and displayed.

Figure 13:
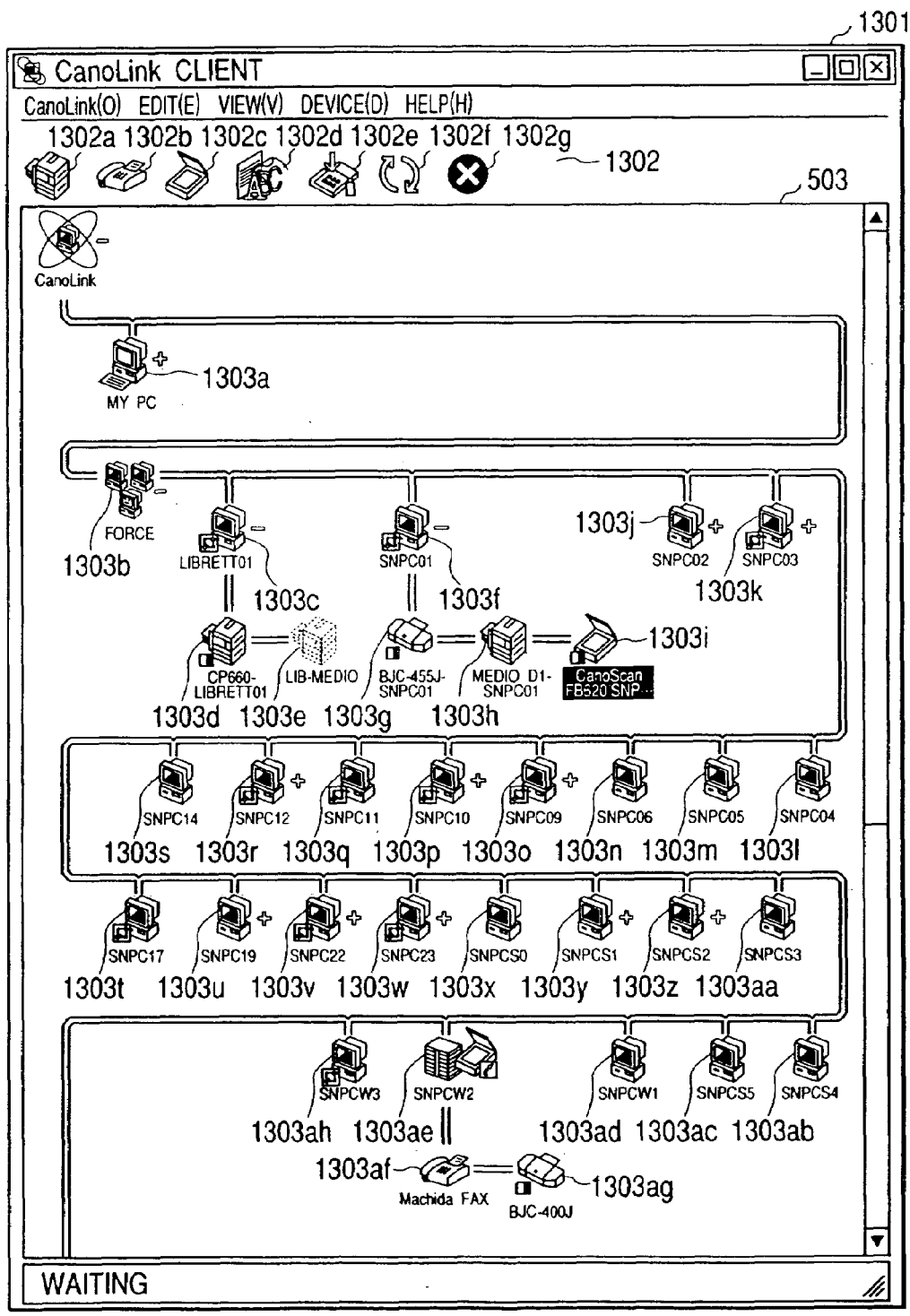

FIG. 13 shows an example of a display screen. The above processes will be specifically explained with reference to FIG. 13. In a manner similar to that mentioned above, a case where the mouse pointer of the mouse 13 is moved to the position of the icon 1103*ae* of the PC by dragging the icon 1103*i* of the scanner shown in FIG. 11 will be explained. In this case, the display form in FIG. 11 is changed to that in FIG. 13.

That is, although the peripherals have been connected to the icon 1103*ae* of the PC shown in FIG. 11, the icon 1103*ae* is displayed in reduced form. In FIG. 13, the icon 1303*ae* of the PC corresponding to the icon 1103*ae* of the PC in FIG. 11 is displayed in expanded form. That is, the icon 1303*af* of the FAX apparatus connected to the icon 1303*ae* of the PC and the icon 1303*ag* of the printer are displayed in expanded form.

In this instance, to display the icons 1303*af* and 1303*ag* of the peripherals connected to the icon 1303*ae* of the PC, it is necessary to move the icons 1103*ae*, 1103*af*, and 1103*ag* shown in FIG. 11. That is, the icon 1303*ae* in FIG. 13 corresponding to the icon 1103*ae* in FIG. 11 is moved to the left along the network line and displayed. Similarly, the icon 1303*ah* in FIG. 13 corresponding to the icon 1103*af* in FIG. 11 is also moved to the left along the network line and displayed. Further, since the icon 1103*ag* of the domain which was being displayed in FIG. 11 is moved downward of the screen, it is not displayed on the display screen in FIG. 13. After the re-display as mentioned above was performed, the processing routine is returned to step S1005 in FIG. 10.

As mentioned above, a peripheral or PC (network apparatus) on the copy source side can be selected and designated by the dragging operation. When the mouse pointer is moved by the dragging operation, the PC (network apparatus) locating at the position indicated by the mouse pointer is selected and designated. When the peripherals are connected to the selected and designated PC and the PC is displayed in reduced form, it is determined that it is necessary to change the display form of the PC. In this case, the display form of the PC is changed from the reduced display to the expanded display. When the PC is displayed in expanded form, the peripherals connected to the PC are displayed in expanded form. Since the peripherals are automatically displayed, when the operator executes the dropping operation at the positions of the peripherals, he can select and designate a peripheral or PC on the copy destination side. The copying function from the copy source to the copy destination can be executed by the dragging operation and dropping operation. For example, the image data read by the image scanner on the copy source side can be printed (outputted) to the printer on the copy destination side.

As mentioned above, by automatically displaying the PC selected and designated by the mouse pointer in expanded form, the peripherals connected to the PC can be easily and efficiently selected and designated by the dropping operation.

When it is necessary to change the display form, the display positions are calculated again and displayed. If it is necessary to change the display positions of the PC and peripherals on the network other than the PC and peripherals in which the display form has been changed, those display positions are again calculated and displayed. Thus, the connecting states of the PCs and peripherals on the network can be efficiently displayed.

Third Embodiment

The third embodiment will be described hereinbelow.

The above second embodiment has been described with respect to an example in which by dragging the icon of the device on the device map display screen to the PC icon, all of the devices connected to the PC are displayed in expanded form.

In the third embodiment, only the peripherals which can operate in an interlocking relational manner with the dragged device among the devices connected to the PC are displayed in expanded form.

For example, when the icon of the scanner is dragged, by displaying only the devices (printer, multifunction apparatus) having the printing function in expanded form, the display space on the device map display screen which is necessary for expanded display is minimized. Thus, such a situation that the display of the device map is remarkably changed due to the expanded display and the user cannot temporarily discriminate the connecting state of the network apparatus can be prevented.

It is sufficient that a combination of interlocking states of the devices is preliminarily registered by the user. As another combination, a printer whose resolution is preferably matched with that of the dragged scanner can be also displayed in expanded form. A printer corresponding to the original reading size of the dragged scanner can be also displayed in expanded form.

Figure 14:
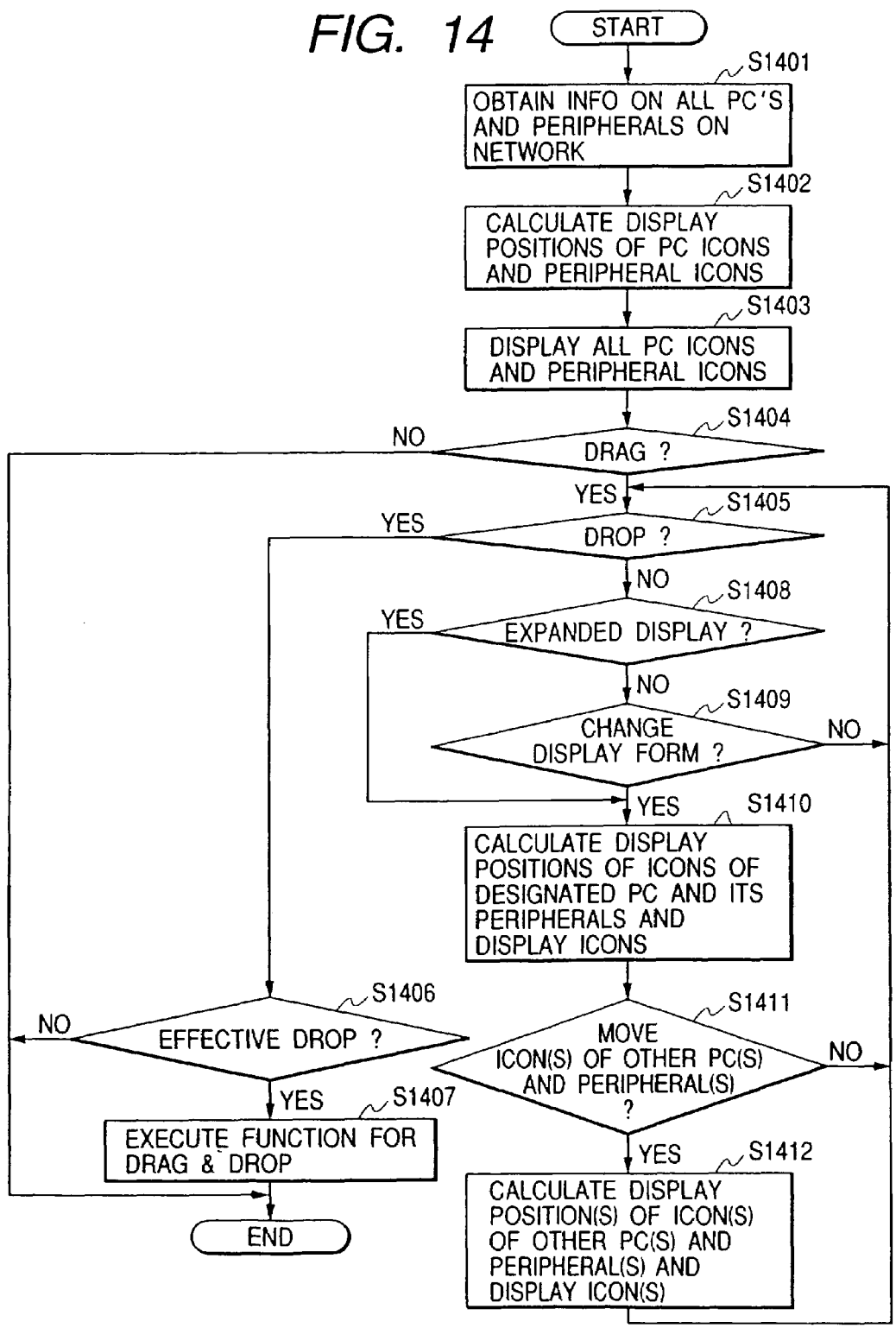
FIG. 14 is a flowchart showing processes of a network apparatus according to the third embodiment.

FIG. 14 is a flowchart showing the third embodiment of the invention.

First, in step S1401, the connection information of all of the shared PCs and devices on the network and the using states and status information of the devices are obtained. Those information is stored.

FIG. 15 shows an example of a data table in which the information obtained in step S1401, namely, the information of each PC and the devices locally connected to the PC on the network has been stored. In the example of FIG. 15, information 1503 regarding PCs (1501, 1502) on the network and information 1503 to 1509 of the devices locally connected to the PC have been stored every PC.

The information of the devices locally connected to the PCs can be obtained by those information. For example, the number of devices connected to the PC can be discriminated. Further, among those devices, the number of devices having the printer function connected to the PC, the number of devices having the scanner function connected to the PC, and the number of devices having the FAX function connected to the PC can be discriminated, respectively.

The positions where the PCs and the devices locally connected to the PC are displayed are calculated on the basis of the obtained information in step S1402. In step S1403, a device map display screen similar to that in each of the first and second embodiments is displayed on the basis of those information.

Whether the dragging operation of the device icon has been instructed by using the mouse pointer 13 or the like or not is discriminated in step S1404. If it is not instructed, the processing routine is finished. If it is instructed, step S1405 follows.

In step S1405, whether the dropping operation of the dragged device icon has been performed or not is discriminated. If the dropping operation is performed, step S1406 follows.

In step S1406, whether the dropping operation is an effective process or not is discriminated. If it is not effective, the processing routine is finished. If it is effective, step S1407 follows and the corresponding function is executed.

The discrimination about the effective process in step S1406 is made on the basis of a data table shown in FIG. 16.

FIG. 16 shows an example of a data table in which combinations of effective functions among the functions possessed by the devices have been stored.

For example, reference numeral 1601 denotes the fact that the scanner function and the printer function are an effective combination and, in the case where the scanner icon is dragged and dropped to the printer icon, the copying function for reading out the image data from the scanner corresponding to the icon and outputting it to the printer corresponding to the icon is executed.

Reference numeral 1602 denotes the fact that the scanner function and the FAX function are an effective combination and in the case where the scanner icon is dragged and dropped to the printer icon, the FAX function for reading out the image data from the scanner corresponding to the icon and outputting it to the printer corresponding to the icon is executed.

When the dropping operation is not performed in step S1405, step S1408 follows. In step S1408, whether the icon designated from the mouse pointer 13 by the dragging operation is the PC icon which is not yet displayed in expanded form and the device has been connected to the PC corresponding to this icon or not is discriminated. If YES, step S1410 follows.

In step S1409, whether the display form is changed or not is further discriminated. That is, whether the icon designated from the mouse pointer 13 by the dragging operation is the PC icon which has already been displayed in expanded form and the device icon which has been displayed in expanded form should be changed on the basis of the combination of the effective functions shown in FIG. 16 or not is discriminated. For example, if the scanner icon has been dragged to the PC icon, it is determined that only the device icons having the effective functions for the scanner function among the device icons which have already been displayed in expanded form to such a PC icon should be displayed in expanded form.

As a discriminating method, whether the device is a device which can execute the effective functions for the dragged icon or not is discriminated on the basis of the data tables shown in FIGS. 15 and 16.

In step S1410, the display positions of the PC and devices connected thereto are calculated and displayed. In this instance, the display positions are calculated on the basis of the number of devices having the effective functions for the device functions of the dragged icon.

Step S1411 follows and whether the display positions of the other icons are moved or not is discriminated. If there is no need to move, the processing routine is returned to step S1405. If it is necessary to move the display positions of the other icons in step S1411, step S1412 follows. The display positions of the icons other than the designated icon are again calculated and displayed. After the display positions were again displayed as mentioned above, the processing routine is returned to step S1405.

Although the first to third embodiments have been described above, the network apparatus which is connected to the network is not limited to the PC but can be set to another computer such as a workstation or the like or can be also set to a printer, a facsimile, or a multi function device so long as it is an apparatus which can locally connect the devices.

To realize the functions of the embodiments mentioned above, program codes of software for realizing the functions of the embodiments are supplied to each network apparatus and the apparatus can be made operative in accordance with a program stored in a computer (a CPU or an MPU) of the network apparatus.

In this case, the program codes themselves of the software realize the functions of the embodiments mentioned above. The program codes themselves and means for supplying the program codes to the computer, for example, a recording medium in which the program codes have been stored construct the invention. As a recording medium for storing the program codes, for example, it is possible to use a floppy disk, a hard disk, an optical disk, a magnetooptic disk, a CD-ROM, a magnetic tape, a non-volatile memory card, an ROM, or the like.

The program codes are incorporated to the embodiments of the invention in not only the case where the functions of the embodiments mentioned above are realized by executing the supplied program codes by a computer but also the case where the program codes are executed in cooperation with the OS (Operating System), another application software, or the like which is operating in the computer and the functions of the embodiments mentioned above are realized.

Further, the invention also incorporates the case where the supplied program codes are stored in a memory equipped for a function expanding board of a computer or a function expanding unit connected to the computer and, thereafter, a CPU or the like equipped for the function expanding board or function expanding unit executes a part or all of the actual processes on the basis of instructions of the program codes, and the functions of the embodiments mentioned above are realized by those processes.

The above embodiments have been merely shown as examples of embodying the invention and the technical scope of the invention should not be limitedly interpreted by them. That is, many modifications and variations of the invention are possible without departing from the spirit of the invention or the main features thereof.

What is claimed is:

1. An information processing apparatus for communication with a plurality of peripherals, said information processing apparatus having a user interface for activating a collapse display in which peripherals are displayed in a collapsed form to save a display area and an expansion display in which the peripherals displayed in the collapsed form are displayed in an expanded form, and said information processing apparatus comprising:

obtaining means for obtaining peripheral information on a plurality of peripherals including first and second peripherals via a predetermined communication medium;

display means for executing the collapse display or the expansion display for each of the first and second peripherals;

discrimination means for discriminating, based on the peripheral information on the first and second peripherals obtained by said obtaining means, whether a certain processing can be executed by combining the first and second peripherals with each other, if the first peripheral is dragged while the collapse display is executed for the second peripheral by said display means, wherein said display means changes the collapse display to the expansion display for the second peripheral if said discrimination means discriminates that the processing can be executed, and said display means maintains the collapse display for the second peripheral if said discrimination means discriminates that the processing cannot be executed;

designation means for designating the first and second peripherals by dropping the first peripheral as dragged on the second peripheral for which the expansion display is executed by said display means; and control means for controlling execution of the processing by causing the first peripheral to transfer data to the second peripheral in response to a designation by said designation means, if said discrimination means discriminates that the processing can be executed.

2. An apparatus according to claim 1, wherein the first peripheral comprises an image input device and the second peripheral comprises an image output device, and wherein said control means causes the image input device to transfer data input with the image input device to the image output device.

3. An apparatus according to claim 2, wherein the image input device comprises a scanner and the image output device comprises a printer or a facsimile device.

4. An apparatus according to claim 1, further comprising displaying means for displaying, distinguishably from other peripherals, at least one peripheral that can be effectively combined with the first peripheral at a timing after said designation means designates the first peripheral and before said designating means designates the second peripheral.

5. An apparatus according to claim 1, wherein said discrimination means discriminates that the one processing can be executed by combining a scanner and a printer or by combining a scanner and a facsimile device.

6. A data processing method for communication with a plurality of peripherals, said method utilizing a user interface for activating a collapse display in which peripherals are displayed in a collapsed form to save a display area and an expansion display in which the peripherals displayed in the collapsed form are displayed in an expanded form, said method comprising the steps of:

obtaining peripheral information on a plurality of peripherals including first and second peripherals via a predetermined communication medium;

executing to display the collapse display or the expansion display for each of the first and second peripherals;

discriminating, based on the peripheral information on the first and second peripherals obtained in said obtaining step, whether a certain processing can be executed by combining the first and second peripherals with each other, if the first peripheral is dragged while the collapse display is executed for the second peripheral, wherein the collapse display is changed to the expansion display for the second peripheral if it is discriminated that the processing can be executed, and the collapse display is maintained for the second peripheral if it is discriminated that the processing cannot be executed;

designating the first and second peripherals by dropping the first peripheral as dragged on the second peripheral for which the expansion display is executed; and controlling execution of the processing by causing the first peripheral to transfer data to the second peripheral in response to a designation, if it is discriminated that the processing can be executed.

7. A method according to claim 6, wherein the first peripheral comprises an image input device and the second peripheral comprises an image output device, and wherein the image input device is controlled to transfer data input with the image input device to the image output device.

8. A method according to claim 7, wherein the image input device comprises a scanner and the image output device comprises a printer or a facsimile device.

9. A method according to claim 6, further comprising the step of displaying, distinguishably from other peripherals, at least one peripheral that can be effectively combined with the first peripheral at a timing after the first peripheral is designated and before the second peripheral is designated.

10. A method according to claim 6, wherein it is discriminated that the one processing can be executed by combining a scanner and a printer or by combining a scanner and a facsimile device.

11. A computer readable memory which stores a computer program capable of performing a data processing method for communication with a plurality of peripherals, the method utilizing a user interface for activating a collapse display in which peripherals are displayed in a collapsed form to save a display area and an expansion display in which the peripherals displayed in the collapsed form are displayed in an expanded form, said method comprising the steps of:

obtaining peripheral information on a plurality of peripherals including first and second peripherals via a predetermined communication medium;

executing to display the collapse display or the expansion display for each of the first and second peripherals;

discriminating, based on the peripheral information on the first and second peripherals obtained in said obtaining step, whether a certain processing can be executed by combining the first and second peripherals with each other, if the first peripheral is dragged while the collapse display is executed for the second peripheral, wherein the collapse display is changed to the expansion display for the second peripheral if it is discriminated that the processing can be executed, and the collapse display is maintained for the second peripheral if it is discriminated that the processing cannot be executed;

designating the first and second peripherals by dropping the first peripheral as dragged on the second peripheral for which the expansion display is executed; and controlling execution of the processing by causing the first peripheral to transfer data to the second peripheral in response to a designation, if it is discriminated that the processing can be executed.

12. An information processing apparatus for communication with a plurality of peripherals, said information processing apparatus having a user interface for activating a collapse display in which peripherals are displayed in a collapsed form to save a display area and an expansion display in which the peripherals displayed in the collapsed form are displayed in an expanded form, and said information processing apparatus comprising:

a communication unit to obtain peripheral information on a plurality of peripherals including first and second peripherals via a predetermined communication medium;

display for executing the collapse display or the expansion display for each of the first and second peripherals;

a first processing unit for discriminating, based on the peripheral information on the first and second peripherals obtained by said communication unit, whether a certain processing can be executed by combining the first and second peripherals with each other, if the first peripheral is dragged while the collapse display is executed for the second peripheral by said display, wherein said display changes the collapse display to the expansion display for the second peripherals if said first processing unit discriminates that the processing can be executed, and said display maintains the collapse display for the second peripheral if said first processing unit discriminates that the processing cannot be executed;

a second processing unit to designate the first and second peripherals by dropping the first peripheral as dragged on the second peripheral for which the expansion display is executed by said display; and a controller for controlling execution of the processing by causing the first peripheral to transfer data to the second peripheral in response to a designation by said second processing unit, if said first processing unit discriminates that the one processing can be executed.

* * * * *